US008630297B2

(12) United States Patent
Subramanian et al.

(10) Patent No.: US 8,630,297 B2
(45) Date of Patent: *Jan. 14, 2014

(54) METHOD AND APPARATUS FOR THE DISTRIBUTION OF NETWORK TRAFFIC

(75) Inventors: Krishnamurthy Subramanian, Mountain View, CA (US); Kalpesh Zinjuwadia, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,294

(22) Filed: Feb. 8, 2011

(65) Prior Publication Data

US 2012/0201252 A1    Aug. 9, 2012

Related U.S. Application Data

(60) Provisional application No. 61/302,285, filed on Feb. 8, 2010.

(51) Int. Cl.
*H04L 12/28* (2006.01)
*H04L 12/56* (2011.01)

(52) U.S. Cl.
USPC ............................ 370/400; 370/242; 370/401

(58) Field of Classification Search
None
See application file for complete search history.

(56) References Cited

U.S. PATENT DOCUMENTS

| 6,778,498 | B2* | 8/2004 | McDysan | 370/231 |
|---|---|---|---|---|
| 6,956,821 | B2* | 10/2005 | Szviatovszki et al. | 370/237 |
| 7,085,241 | B1* | 8/2006 | O'Neill et al. | 370/254 |
| 7,289,531 | B2* | 10/2007 | Van Den Bosch et al. | 370/466 |
| 7,319,700 | B1* | 1/2008 | Kompella | 370/400 |
| 7,447,151 | B2* | 11/2008 | McDysan | 370/231 |
| 7,746,789 | B2* | 6/2010 | Katoh et al. | 370/238 |
| 7,936,783 | B1* | 5/2011 | Bharali et al. | 370/238.1 |
| 7,990,888 | B2* | 8/2011 | Nadeau et al. | 370/254 |
| 2004/0032856 | A1* | 2/2004 | Sandstrom | 370/351 |
| 2008/0062891 | A1* | 3/2008 | Van der Merwe et al. | 370/254 |
| 2010/0142421 | A1* | 6/2010 | Schlicht et al. | 370/310 |

* cited by examiner

*Primary Examiner* — Michael J Moore, Jr.
*Assistant Examiner* — Omeed D Rahgozar
(74) *Attorney, Agent, or Firm* — Haynes and Boone, LLP

(57) ABSTRACT

A packet network system, such as an autonomous system, includes a plurality of packet network devices some of which are edge routers and some of which are core routers. Each of the edge and core routers include functionality that operates to receive network traffic, process the traffic as needed and to forward the traffic to its destination. Additionally, each router includes a traffic distribution function that operates to calculate path bandwidths for all of the paths over which the traffic can be forwarding through the system and to use the volume of traffic ingressing to the system, link utilization information and the calculated path bandwidth to redistribute the traffic in the system such that traffic loss in the system in minimized.

15 Claims, 6 Drawing Sheets

METHOD AND APPARATUS FOR THE DISTRIBUTION OF NETWORK TRAFFIC

CROSS REFERENCE TO RELATED APPLICATIONS

This application claims the benefit under 35 U.S.C. §119 (e) of U.S. Provisional Patent Application Ser. No. 61/302,285 entitled "Weighted Equal Cost Multipath Method", filed Feb. 8, 2010, the entire contents of which is incorporated by reference.

BACKGROUND

1. Field of the Invention

The present disclosure relates generally to packet network devices such as switches and routers, and more particularly to methods for the optimal and dynamic, global distribution of traffic ingressing to a network system over multiple paths.

2. Description of Related Art

A network system operating according to the Internet Protocol (IP) is typically comprised of some number of network systems (NS), such as the NS 100 shown in FIG. 1. The term network system and autonomous system are interchangeable in this context. Up until recently, an AS was considered to be a set of routers under the administration of a single entity, using an interior gateway protocol and using common metrics to route packets within the AS. More recently, it has become common for a single AS to employ two or more interior gateway protocols (IGP) and several sets of metrics. From one perspective, an AS can be considered to be a connected group of one or more IP prefixes, run by one or more network operators, which has a single, clearly defined routing policy.

The NS 100 of FIG. 1 includes a number of edge routers (ER1-ERn) connected to a core network. The core network is comprised of a plurality of core routers (CR), $CR_1$ to $CR_n$, that operate to forward traffic received from one of the edge routers (ER1-ERn) to another core router or to another one of the edge routers (ER1-ERn). All of the ERs are connected to at least one core router by one or more physical or logical links. Each of the ERs is capable of receiving traffic from outside the NS 100 and sending this traffic to the core network where it is forwarded to an ER for transmission outside the NS. Based on the topology of NS 100, multiple paths through the NS can be calculated for traffic ingressing on any of the ERs.

In FIG. 1, a flow of traffic labeled $T_{i/o}$ ingresses to or egress from $ER_1$, and this traffic $T_{i/o}$ can be distributed by the routers comprising NS 100 in proportions D1, D2 and Dn to each of a plurality of the ERs, ER2, ER3 and ERn respectively. Each portion D1, D2 and Dn represents a certain amount of traffic that is typically measured in bits of information per second, for instance, and each portion can be the same or different amounts of traffic. As shown in FIG. 1, the portion D1 can be distributed over a path P1, portion D2 can be distributed over a path P2 and portion Dn can be distributed over a path Pn through the NS 100. Each of the paths, P1-Pn, can be comprised of a sequence of multiple routers connected by the physical or logical links, and each of the links are capable of supporting a particular amount of traffic. While the links connecting the routers in NS 100 are shown as single links, each of the links can be either single physical links or an aggregation of two or more logical links. Each of the links can support a particular volume or amount of network traffic, which is referred to as link bandwidth. The capability of a network link to support a particular volume of network traffic is determined by the capacity of physical interfaces connected to a link to process the volume of traffic. Physical interfaces included on a router can be designed to process traffic ingressing to them at various rates, which currently can approach 40 Gbits/second. The amount of traffic that a link can support is typically referred to the link bandwidth, and the unused or available link bandwidth at any point in time is referred to as instantaneous available link bandwidth or simply available link bandwidth. Path bandwidth is the minimum of the link bandwidths or available link bandwidths of all of the links comprising a path through the network system. So for example, network traffic $T_{i/o}$ can be forwarded along the path P1 which includes ER1 (ingress router), core router CR0 and ER2 (egress router), and the available bandwidth over path P2 is the minimum link bandwidth along the path P1. In this case, path P1 includes a link, L1, that connects ER1 to CR0 and a link, L2, that connects CR0 to ER2. If the bandwidth of link L1 is 10 Gbits/second and the bandwidth of link L2 is 5 Gbits/second, then the path P1 bandwidth is lesser of the two link bandwidths, or 5 Gbits/second.

In order to forward the traffic $T_{i/o}$ over path P1 in the NS 100 without the loss of any information, it is necessary for the available bandwidth of path P1 to be greater than or equal to the volume or amount of traffic in $T_{i/o}$. Assuming that the available path P1 bandwidth is equal to or greater than the volume of traffic in $T_{i/o}$, if the NS 100 is stable along path P1 (i.e., the link states comprising the path are not changing), the traffic $T_{i/o}$ can be forwarded over path P1 without the loss of any information. However, in the event that one or more internal ports associated with a link comprising path P1 flaps (fails), the available path P1 bandwidth may be lowered, resulting in the loss of some of the traffic $T_{i/o}$ until the routers comprising NS 100 can recalculate a new path and program their forwarding tables to redirect some or all of the traffic $T_{i/o}$. Prior art traffic redistribution methods are limited in as much as the network protocol running on each router in the system only considers the traffic $T_{i/o}$ ingressing to it when recalculating a route through the network system.

Interior Gateway Protocols (IGP) running on routers or switches in a network system operating according to the Internet Protocol (IP) generally operate to collect certain information from neighboring routers and switches that can be used to calculate paths through the network that are used to forward network traffic. As described earlier with reference to FIG. 1, a path can be comprised of a sequence of multiple routers connected by physical or logical links, and each of the links are capable of supporting a particular amount of traffic. Depending upon the complexity of the network system, there can be multiple paths between two different network edge devices, such as the ERs of FIG. 1. Typically, an IGP, such as the well known OSPF (Open Shortest Path First) protocol, uses a cost metric associated with each router interface (physical or logical) to calculate one or more shortest paths from the router to a destination. The cost metric can be assigned to each interface by a system administrator and this cost metric can dependent on the distance from one router to another (round-trip time), link bandwidth, link availability (delay), and/or link reliability factors to name only three criteria that can be considered when assigning cost to a router interface. The OSPF protocol running on a router uses the costs assigned to each of its interfaces to calculate the shortest paths from it to a destination address, for instance. Specifically, the Dijkstra algorithm is typically used to calculate the least cost paths through a network system, such as the network system 100 in FIG. 1. The result of applying the Dijkstra algorithm to link state information maintained by each router is a series of connected routers that represent the least cost paths to each router and the cost of each path.

Referring again to FIG. 1, if the result of the calculation to identify the least cost paths from ER1 to ER3 in the NS 100 result in a path P2 cost equal to three and a path P3 cost equal to three, then OSPF running on ER1 will typically select either path P2 or path P3 (assuming P2 and P3 have enough available bandwidth to support the traffic) as the paths for traffic $T_{i/o}$ through the NS 100. Paths P2 and P3 are in this case considered to be equal cost paths, and the routing technique most commonly employed to select which of two or more equal-cost paths to forward a flow of traffic is the well known Equal Cost Multi-Path (ECMP) routing technique. ECMP is a routing technique that is explicitly supported by the OSPF protocol. A number of different methods can be used to determine which of several equal cost paths or next hops are selected. Hash-threshold is one method for determining which of several equal cost next hops to select and the round-robin method is another. Each method has their advantages and disadvantages and the reasons for selecting one of the other method is not discussed here. ECMP routing techniques typically divide the traffic with a common destination equally among the multiple equal cost paths, regardless of the bandwidth that is available on any one of the equal cost paths and regardless of the technique employed to select the traffic transmission path.

Continuing to refer to FIG. 1, assuming that the traffic$_{i/o}$ is being forwarded over two equal cost paths, paths P2 and P3 for instance, and that the available bandwidth on path P2 is 1 Gbit/second and that the available bandwidth on path P3 is 2 Gbits/second, if ECMP routing distributes traffic $T_{i/o}$ equally between paths P2 and P3, and if a port associated with the link L5 comprising path P2 flaps (assuming L5 is a logical link comprised of multiple physical links), then depending upon whether path P2 is oversubscribed or not, some traffic may be dropped from that portion of the traffic $T_{i/o}$ flowing over path P2.

SUMMARY

In light of the limitations associated with the prior art network traffic distribution methods and in light of the limitations associated with the prior art ECMP routing techniques, it would be advantageous to improve the distribution of network traffic in a manner that globally, with respect to a network system, mitigates traffic loss due to dynamic instability in the system, and it would be advantageous to improve upon the prior art methods for selecting the best path, among two or more equal cost paths, over which to forward network traffic. According to one embodiment, a traffic distribution function running in each of a plurality of routers in a network system operates to apportion the distribution of some or all of the traffic ingressing to the network system among two or more eligible paths in the network system by receiving routing information necessary to calculate a set of two or more eligible paths through the network system, receiving available bandwidth information associated with each of the links connecting each of the network devices to another network device in the system, and using the received information to calculate the available bandwidth associated with each one of the paths in the set of eligible paths, using the available path bandwidth information to calculate common forwarding table entries which each of the plurality of routers use to update entries in their forwarding table, and each of the routers comprising the network system apportioning the distribution of traffic ingressing to them over the set of two or more eligible paths according to the bandwidth available on each path.

In another embodiment, traffic ingressing to each one of a plurality of routers comprising a network system is prioritized, and distributed by the traffic distribution function over eligible paths in the network system according to its priority, with the highest priority traffic being distributed first and the traffic being distributed so that there is minimal traffic loss.

In another embodiment, a packet network device comprising a network system receives a link state advertisement from one or more other packet network devices in the network system, the link state advertisement includes, among other things, a network interface index and bandwidth, interface type and path bandwidth, the packet network device accesses its forwarding table entries and determines that two or more equal cost paths can be selected over which to forward received network traffic, using the bandwidth information received in the link state advertisement to calculate a weighting for the two or more equal cost paths; and proportionately forwarding the received traffic over the two or more weighted equal cost paths according to calculated path bandwidth weighting.

DETAILED DESCRIPTION

Figure 1:
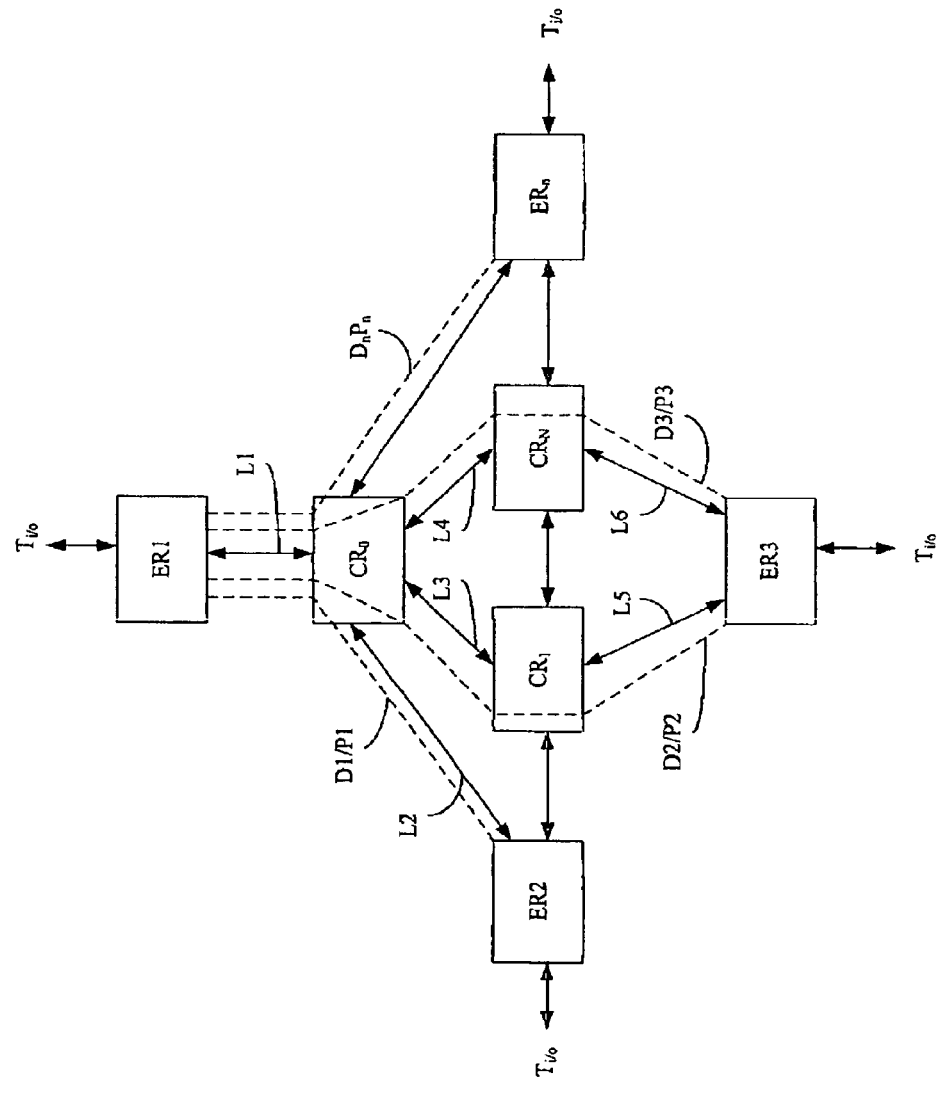
FIG. 1 is an illustration of a network system 100.
Figure 2:
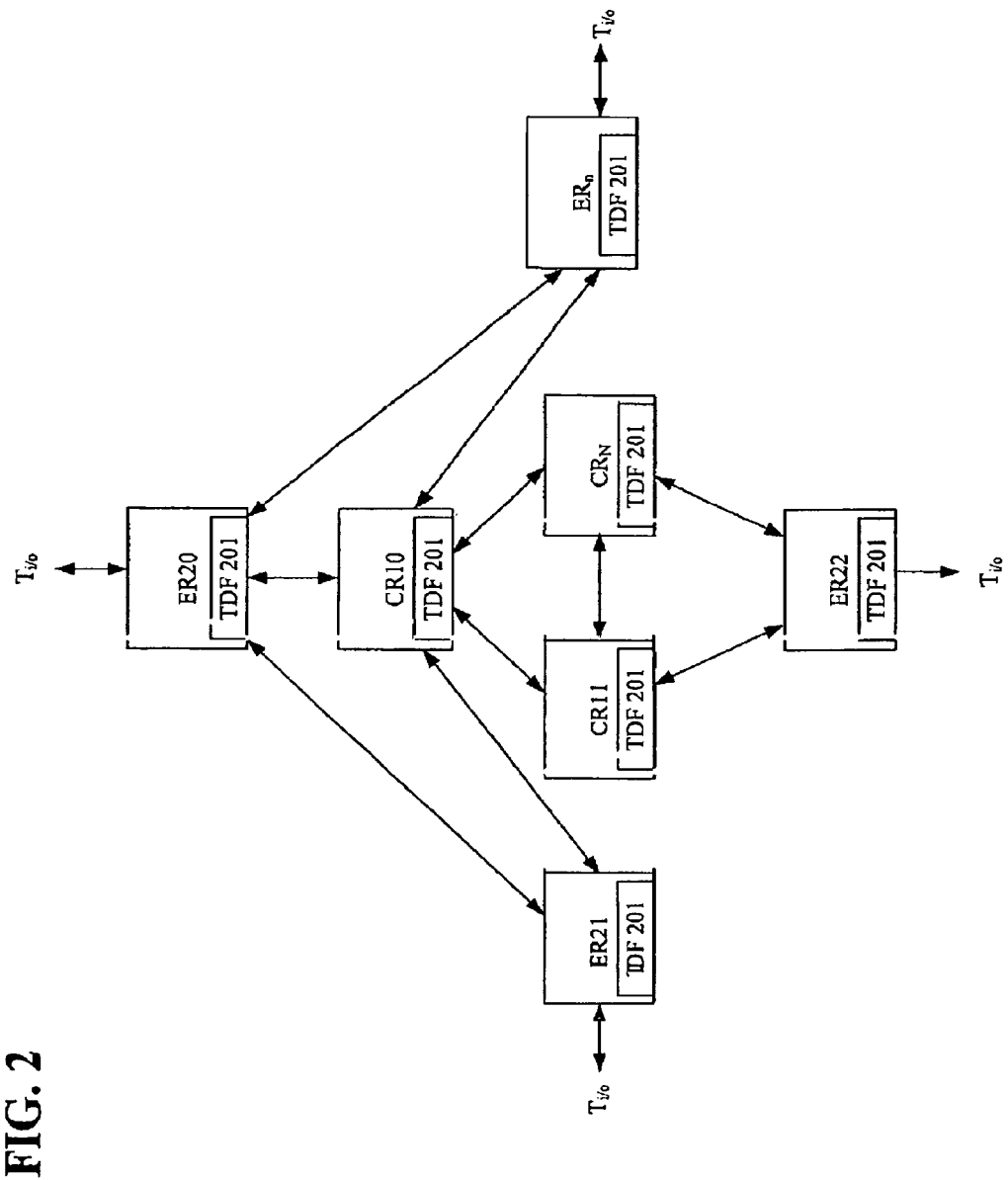
FIG. 2 is an illustration of an network system 200 that includes a distributed traffic distribution function.

FIG. 2 illustrates a network system 200 similar to the network system 100 of FIG. 1. Network system 200 can be an autonomous system and it can include a plurality of edge routers, ER10-ERn, a plurality of core routers, CR0-CRn, and the network system 200 in one embodiment can include a distributed Traffic Distribution Functionality (TDF) 201. In a preferred embodiment, each router (CR and ER) comprising the NS 200 can include the TDF 201. The network system 200 operates in a manner similar to that of network system 100 described earlier with reference to FIG. 1, with the exception that the TDF 201 manages the global (network system wide) redistribution of traffic according to one or more traffic redistribution goals that the TDF 201 is configured to enforce. Each instance of the TDF 201 considers all of the traffic ingressing to the NS 200 when calculating one or more routes through the NS 200. Generally, the TDF 201 operates to continually collect/receive real-time information associated with traffic ($T_{i/o}$) ingressing to and egressing from each ER in the system, to receive available bandwidth information associated with each link in the system, and to receive an indication of the volume of traffic flowing through each link in the system 200. In one embodiment, the TDF 201 that is included on each of the routers comprising system 200 can use the real-time information that it receives from each of the other routers in the system 200 to calculate the available bandwidth associated with all eligible paths through the network system 200. Eligible paths in this case include paths of equal or unequal cost, as calculated by an IGP running on each of the network system 200 routers, over which traffic ingressing to the NS 200 can be forwarded to reach their proper destination (DA). The TDF 201 can then use the available path bandwidth information to calculate FIB (forwarding information base) table entries that can be used to update existing forwarding table entries included on each of the routers in the NS 200. Each of the routers comprising the NS 200 can then use the updated forwarding table entries to optimally redistribute some or all of the traffic flows ingressing to the network system 200 to any two or more of the eligible paths through the system such that a minimal traffic loss policy is enforced. According to an embodiment, based upon the TDF 201 operation, NS 200 traffic flowing through some or all of the eligible paths in the NS 200 can be redistributed in a manner that enforces a minimum traffic loss policy in the NS 200. For the purpose of this description, a traffic flow means traffic ingressing to the NS 200 over any one or more of the routers comprising the system 200 and which have a common destination (DA).

According to another embodiment, the TDF 201 of FIG. 2 can be configured to enforce a global policy for the redistribution of traffic that minimizes traffic loss according to the priorities of individual traffic flows in the NS 200. A network administrator can select one or more priority criteria that are used by the TDF 201 to determine how to assign network traffic to eligible paths in the NS 200, such that traffic loss is minimized in the highest priority traffic first. The TDF 201 can be configured to examine traffic flows for particular characteristics, which among other things can include such characteristics as the bandwidth requirement of a flow, the ingress and/or egress router identity, the traffic pattern, and the amount of traffic flowing through the routers. Depending upon the priority level (high to low) of a flow calculated by the TDF 201, the TDF can calculate forwarding table entries which biases the distribution of traffic, assigned different priority levels, to routes/paths that are undersubscribed or not.

A more detailed description of one embodiment will be undertaken with reference to FIG. 3, which is a diagram of a router 30 showing functionality that can be employed to support the TDF 201 described with reference to FIG. 2. For the purpose of this description, router 30 represents any of the ERs and CRs comprising NS 200. The core/edge router 30 can include, among other functionality, a control module 31 that is generally responsible for running management plane functionality on the router, and one or more line cards (LC) 32 which are generally responsible for data plane functionality. Router 30 can also include switch fabric modules and other functional modules, but for the purpose of this description it is not important to describe their operation, and so they are not included in FIG. 3. The control module 31 can include one or more route processor modules (RPMs) which generally operate to run network protocols necessary for the operation of the router 30 in the network environment in which it is located. In this case, a single RPM 33 is shown which can run a layer-3 interior gateway protocol (IGP) 34, such as the well known Open Shortest Path First (OSPF) protocol or the Intermediate System to Intermediate System (IS-IS) protocol. The IGP 34 is comprised of a number of interdependent functions, such as a route processing function, an extended link state advertisement (LSAx) function (described later), an ECMP function, and it includes a store of state information associated with each of the links in the NS 200. The RPM also includes a forwarding information base (FIB) that is maintained by a FIB manager operating in conjunction with the layer-3 network protocol, and the RPM includes a forwarding table manager sends information and instruction to a forwarding table client function, running on the line card 32, which uses the information and instructions to update appropriate entries in a forwarding table stored on the line card 32.

Figure 3:
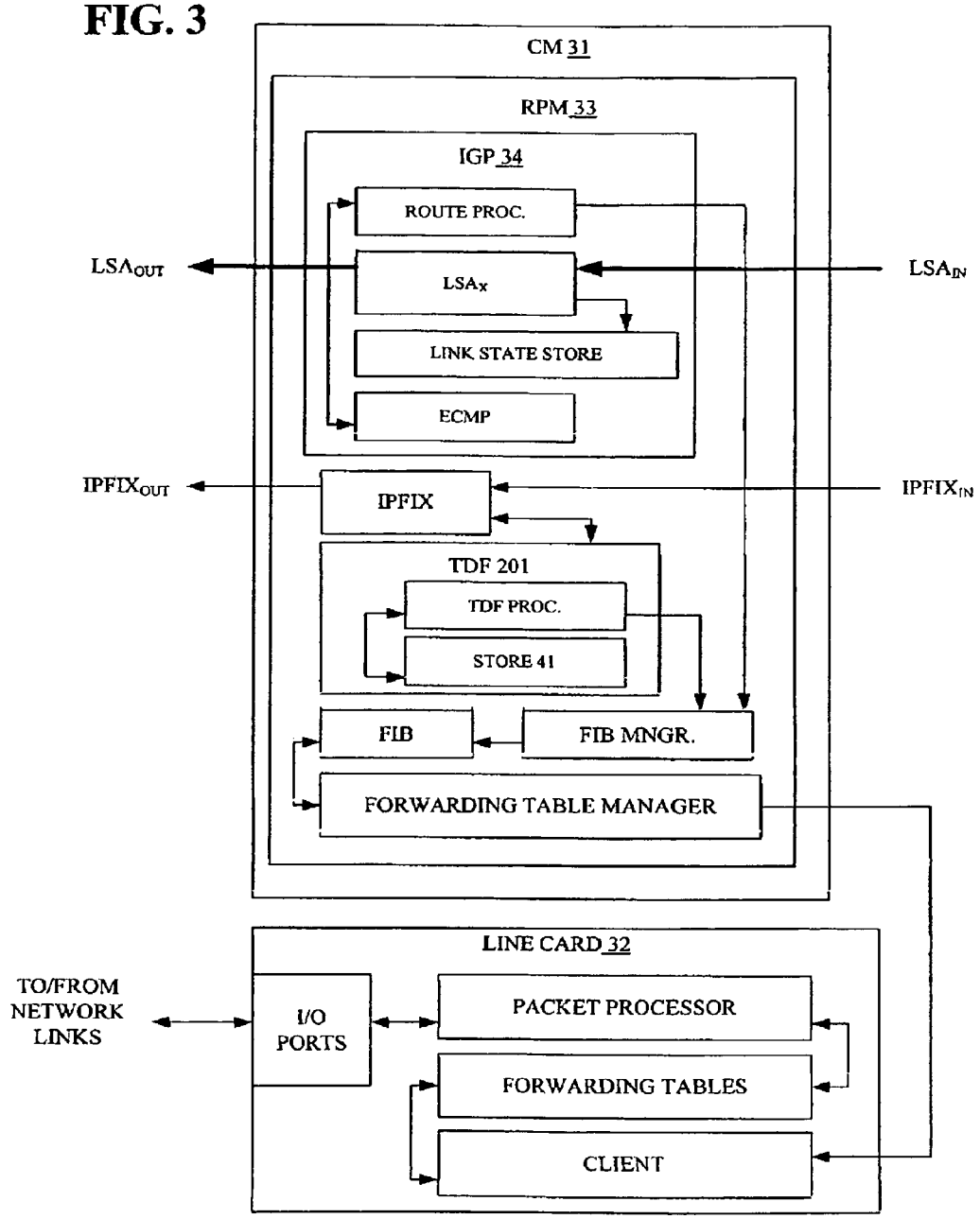
FIG. 3 is a diagram of a router in the network system 200 with functional blocks that operate to support an embodiment of the traffic distribution function.

Continuing to refer to FIG. 3, the router 30 also includes IP Flow Information Export (IPFIX) protocol functionality and the TDF 210 functionality alluded to earlier with reference to FIG. 2. The IPFIX protocol is described in the publically available IETF RFC 5101 specification. The IPFIX protocol generally operates to transmit IP traffic flow information over the network, such as the NS 200 in FIG. 2. This IP traffic flow information can include the volume of traffic ingressing to and egressing from one or more of routers in FIG. 2, it can include the bandwidth availability on a particular NS 200 link, and it can include information associated with the volume of traffic being transmitted over a link. All of this bandwidth and traffic flow information can be included in IPFIX messages that are generated by the IPFIX protocol running on each of the routers comprising the NS 200. These IPFIX messages can be transmitted to all of the neighboring routers in the NS 200. The format of these IPFIX messages is described in RFC 5101. The RPM 33 can also include TDF 201 functionality which will be described later in detail with reference to FIG. 4, but generally employs a TDF processing function to operate on information in a store 41 to, among other things, calculate path bandwidth for each of the paths calculated by the IPG 34 of FIG. 3, to calculate link utilization information that is maintained in the store 41 and to use the results of these calculations to determine how to redistribute traffic in the NS 200.

Continuing to refer to FIG. 3, the IGP included on router 30 supports the transmission of link state advertisements (LSAs) to neighboring routers in the NS 200. An LSA is employed by the OSPF protocol to communicate a routers local routing topology to all of the other routers directly connected to it. There are currently eleven different types of LSAs, and one or more of these LSA types can be generated by the OSPF protocol depending upon the needs of the network. According to an embodiment, the IGP in RPM 33 generates an LSA (can be type 9 opaque, type 10 opaque or type 11 opaque) that is extended (LSAx) to include, among other things, information associated with a path bandwidth calculated by the router, an interface bandwidth (can be any one of a plurality of logical or physical interface bandwidths associated with the router) and the identity or index of the interface, as well as the interface type (physical, LAG, VLAN).

The line card 32 of FIG. 3 can be comprised of, among other things, one or more I/O ports, packet processing functionality, memory in which to store one or more forwarding tables and a forwarding table manager client. The router 30 will typically include more than one line card, but for the purpose of this description, only one line card is shown in FIG. 3. The I/O ports operate, as a physical interface between the router 30 and the network system 200, to transmit and to receive information in various formats (typically in packet format) to and from the network system respectively. The ports send and receive this information to and from the packet processor which generally operates to examine the packets of information to determine how to forward them to a next hop in the network system. The information included in forwarding table entries can be accessed by the packet process to make the next hop forwarding determination. An finally, the forwarding table manager client receives instructions and information from the forwarding table manager in the RPM 33 that it uses to update entries in the forwarding table in the line card 32.

Figure 4:
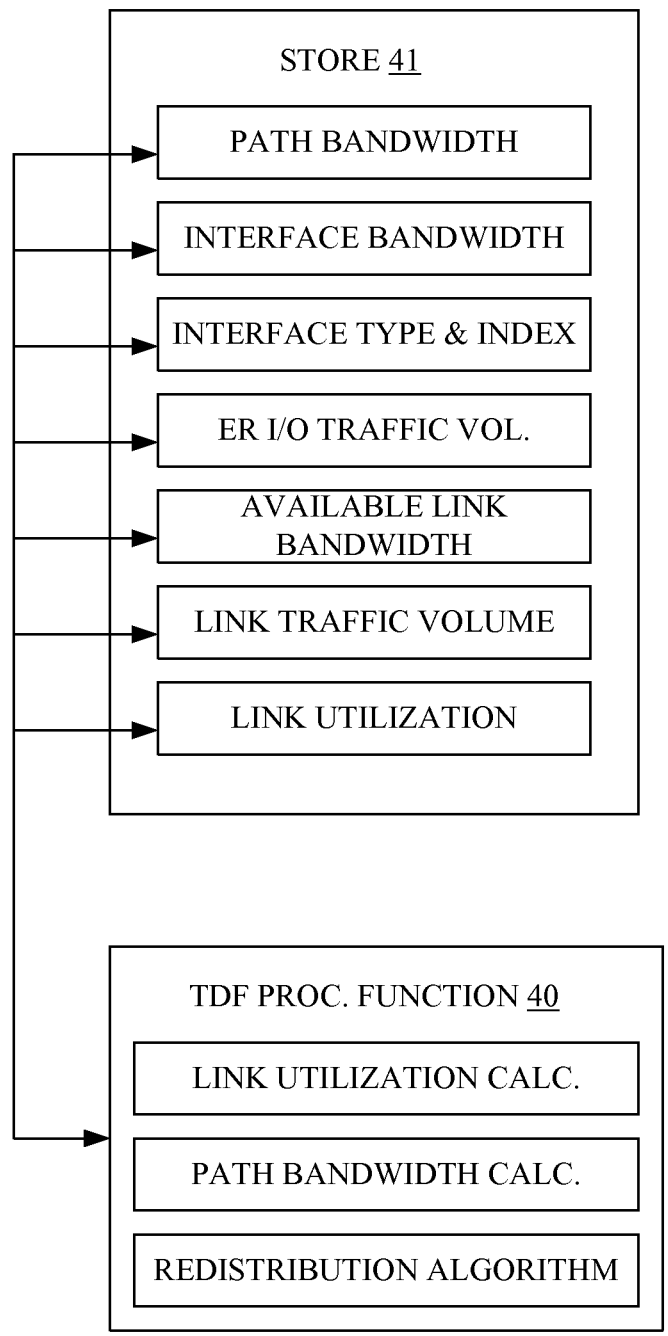
FIG. 4 is a block diagram of a router showing an embodiment of a traffic distribution function.

The component parts comprising the Traffic Distribution Function (TDF) 201 will now be described with reference to FIG. 4. As described earlier, an instance of the TDF 201 runs on each of the routers comprising the NS 200. The TDF 201 has access to a set of stores 41 that include various global NS 200 bandwidth and traffic flow volume information. All of the stores 41 included in each of the routers are comprised of information that is substantially the same, and the stores 41 can reside in memory associated with the CM 31 and are accessible by any of the functionality in the RPM 33. For the purpose of this description, it is assumed that the TDF 201 has access to all of the stores 41, and the diagram in FIG. 4 shows each of the different stores of information 41 as being associated with the TDF 201. TDF 201 also includes a TDF processing function 40 which is comprised of a traffic redistribution algorithm, a path bandwidth calculation function and a link utilization calculation function.

As described earlier with reference to FIG. 3, the RPM 33 maintains various NS 200 information that is used to calculate path bandwidth and determine how traffic is distributed on a global basis with respect to the NS 200. FIG. 4 includes a plurality of stores 41 where this NS 200 information is maintained. One store includes bandwidth information for each of the paths calculated by each of the routers in the NS 200 over which the routers can forward traffic. The paths calculated by each of the routers can be multiple, equal cost paths or not, the paths can include one or more links and the links can include one or more physical or logical links. Another store includes bandwidth information associated with each of the physical or logical interfaces connected to a link. Each interface is designed to process a particular volume of traffic, such a 1 Gbit/sec, and this store can include this type of information. Another store includes the type of each interface (physical, VLAN, LAG) associated with the interface bandwidth information and the identify or index of the interface. Another store includes information associated with the volume of traffic ingress to and egressing from each of the ERs comprising the NS 200. A metric such as bits, bytes or packets that are processed per second by the ER can be stored here. Another store includes the bandwidth that is available at each of the links comprising the NS 200. Available link bandwidth for any particular link can be calculated by each router connected to the link by subtracting the volume of traffic through a link at a point in time (or average vol. of traffic through a link over a period of time) from the total link bandwidth. Another store can include information associated with the volume of traffic passing over each of the links in the system. And finally, another store can include information associated with bandwidth utilization of each of the links in the NS 200. Specifically, this store includes two lists, a first list stores the identifies of all links that are under-utilized (UULs), and a second list stores the identifies of all links that are over-utilized (OULs).

Continuing to refer to FIG. 4, the TDF processing function 40 running in each instance of the TDF 201 on each router generally operates to use information in the stores to calculate available path bandwidth for each of the paths that are calculated by the IGP 34 for the NS 200, it uses the calculated available path bandwidth to calculate FIB entries that is sends to the FIB manager, described with reference to FIG. 3. The TDF processing function 40 also includes a link utilization calculation function that operates to determine whether a link is under or over utilized and to maintain the link utilization store. Link utilization is determined by calculating whether the volume of traffic entering a link (link traffic volume or Tin) is greater than or less than the available bandwidth to the link (Tin>or<Available Link Bandwidth). If Tin is greater than the available link bandwidth, the link can be considered over-utilized, and if Tin is less than the available link bandwidth, the link can be considered under-utilized. More specifically, a network administrator can specify how much greater Tin is than the link bandwidth before the link is over utilized, and vice versa. The path bandwidth calculation function included in the TDF processing function 40 uses Equation 1, below, to calculate the available bandwidth for each of the paths known to the IGP running in each of the routers comprising the NS 200, and the path bandwidth is a function of the lowest available link bandwidth for each of the links in the path. So, for a path P1 that includes four links, L1-L4, the link with the lowest bandwidth is equal to the path bandwidth.

(For a path comprised of links 1, 2, 3 and 4) Path Bandwidth=Minimum ($BW$link1, $BW$link2, $BW$link3, $BW$link4) w/$BW$linkn=available link bandwidth The individual path bandwidths calculated by the bandwidth calculation function using Equation 1 can be stored in the path bandwidth store and can, separately or in combination with other path and link bandwidth information stored in or accessible to the TDF 201, be used by the redistribution algorithm in the TDF processing function 40 to calculate FIB table entries.

In operation, the TDF processing function 40 continually/periodically updates the link utilization lists, it detects changes to link bandwidth availability and calculates updated bandwidths for all of the paths known to the router in which the instance of the TDF 201 resides. When the TDF 201 detects a change in a link bandwidth availability, it invokes the redistribution algorithm in the TDF processing function 40 to perform the following steps:

Generally: Compare the sum of the bandwidth (BWtotal) of a set of multiple paths against the flow of Traffic ($T_i$) in to ER. If BWtotal is greater the $T_i$, then the operation of the TDF 201 can result in no traffic loss . . . otherwise Traffic loss can be minimized.

For each router running TDF 201 in NS 200, check if any links in eligible paths comprising NS200 that are included in the listing of OUL. If so, then do the following:

1. ID OUL in each path, calculate how much traffic needs to be redistributed . . . this calculation can be performed as follows:

Assuming that the Traffic $T_i$ is being distributed equally over each of the paths in the set of paths (ECMP), then for each path, Redistributed Traffic ($T_r$)=$T_i$/number of paths−path bandwidth So if $T_i$ is 3 Gbps, and $T_i$ is forwarded equally over each of three paths, then the flow of traffic over each path is 1 Gbps. If for some reason, the available bandwidth for one of the three paths decreases, due to the bandwidth available to a link along the path decreasing, then TDF will detect that this link is an OUL and perform the above calc.

2. Deactivate/relax ECMP function.

3. Adjust path bandwidth so that OUL becomes UUL, remove this OUL from list.

4. Identify paths with UULs, determine that path bandwidth is underutilized and redistribute traffic calculated in #1 equally to all of these paths without over utilizing any links . . . if this causes a previously UUL to become OUL, then the redistribution of $T_i$ to this path is not permitted. In order to redistribute the traffic, it is necessary to update the forwarding tables as follows. Assuming that ECMPs are identified for a flow of traffic, that each of the path costs have been calculated and that the total path bandwidth is known, then for all ECMPs, OSPF can calculate how much of the flow is distribute of each of the ECMPs as follows:

If there are n ECMPs d(P1-Pn) for a given network destination address

And the respective path bandwidths are BW1-BWn for a total ECMP bandwidth ($BW_{tot}$)=sum (BW1-BWn)

Find the % of the total bandwidth attributable to each path using Equation 1:

$$\% BW \text{ for a path } Pn, BW'n=((BWn \times 100)/BW_{tot}), BW'n \quad \text{Equation 1}$$

is the percentage of the $BW_{tot}$ that is apportioned to path Pn

If the maximum number of ECMPs the forwarding table can support is Emax, then all of the BW, then use Equation 2 to determine how to distribute the ECMPs across Emax.

$$ECMP \% \text{ for path } Pn, En=(BW'n \times E\max)/100 \quad \text{Equation 2}$$

OSPF than uses the information calculated in Equation 2 to program the FIB.

5. If OULs traffic is successfully redistributed (no UULs become OULs), then remove it from OUL list [If the TDF determines that the link is over utilized by 250 Mbps, then TDF will attempt to redistribute this amount of traffic in $T_i$ equally over each of the other paths in the set of paths].

6. Remove any UULs from list that are no longer underutilized after the redistribution 7. If there are no UULs left in any paths, then process terminates in this router and another router can run the process 8. Update the path bandwidth store to reflect any changes to the path bandwidths as the result of the redistribution.

Operation of the traffic redistribution function 201 can result in the redistribution of one or more traffic flows in NS 200. For instance, if as a result of the redistribution of a first flow of traffic over a first path, a link comprising a second path may become underutilized (UUL). In this event, TDF 201 try to redistribute traffic to this UUL. TDF 201 continually monitors information received from the NS 200 and attempts to redistribute traffic entering NS 200 in an optimal manner in order to enforce the minimum traffic loss policy.

Figure 5:
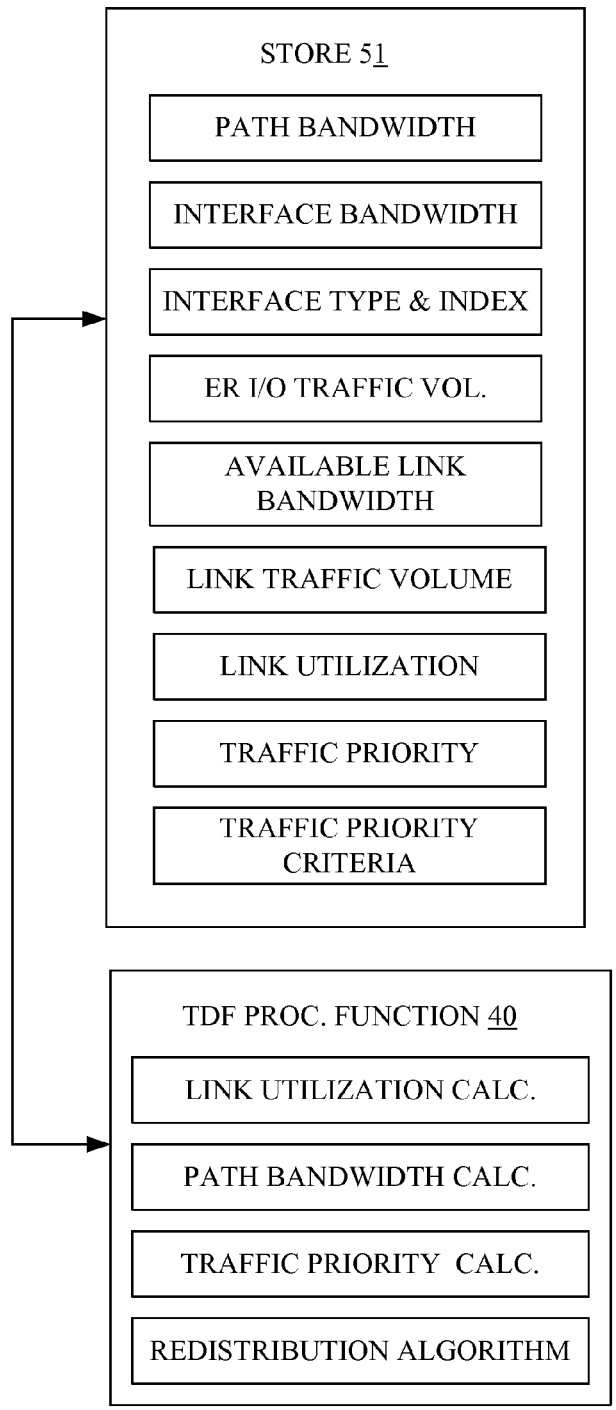
FIG. 5 is a block diagram of a router showing another embodiment of a traffic distribution function.

FIG. 5 is a diagram showing functionality and information stores that can be employed in another embodiment of a TDF 501. In a preferred embodiment, the TDF 501 functionality is distributed and can be included in each of the routers (ERs and CRs) comprising the NS 200 of FIG. 2. However, in contrast to the TDF 201 described earlier, TDF 501 is configured to redistribute NS 200 traffic so as to minimize traffic loss according to the priority of the traffic ingressing to a router. With the exception of the traffic priority store included in the store 51 and the traffic priority calculation function included in the TDF processing function 50, the TDF 501 operates in much the same manner as the TDF 201 described earlier with reference to FIG. 4. The redistribution algorithm in this embodiment is designed to attempt to first redistribute the highest priority traffic over paths in which each of the links comprising the path are undersubscribed, and then attempt to redistribute lower priority traffic. In order to enforce the policy (minimization of traffic loss according to traffic priority) for which the TDF 501 is configured, it may be necessary for the TDF 501 to redistribute some lower priority traffic through oversubscribed paths which can result in some traffic loss for these flows. The TDF 501 is configured with one or more traffic prioritization criteria, which can include, but not limited to, the bandwidth needed to support the flow of traffic (traffic bandwidth), traffic cost (number of hops from ingress router to destination), and the identity of the router into which the traffic ingresses or from which it egresses. These traffic prioritization criteria can be stored in memory associated with of accessible by the CM 31 described earlier with reference to FIG. 3. For the purpose of this description, these prioritization criteria are included in the stores 51.

In operation, the TDF processing function 50, running on each router in NS 200, continually/periodically updates the link utilization lists, it detects changes to link bandwidth availability and calculates updated bandwidths for all of the eligible paths in the NS 200. The TDF processing function 50 running on each router also continually receives information relating to traffic ingressing to each of the routers in the NS 200, and the traffic priority calculation function in the TDF processing function 50 uses the traffic priority criteria in the store 51 to calculate a traffic priority for the flow and to store this traffic priority in the traffic priority store. When the TDF 501 detects a change in a link bandwidth availability, it invokes the redistribution algorithm in the TDF processing function 50 to perform the following steps:

Generally: Compare the sum of the bandwidth (BWtotal) of a set of multiple paths against the flow of Traffic (Ti) in to ER. If BWtotal is greater the Ti, then the operation of the TDF 201 can result in no traffic loss . . . otherwise Traffic loss can be minimized.

For each router running TDF in NS 200 (and starting with the highest priority traffic), check if any links in eligible paths comprising NS 200 that are included in the listing of OUL. If so, then do the following:

1. ID OUL in each path, calculate how much traffic needs to be redistributed . . . this calculation can be performed as follows:

Assuming that the Traffic $T_i$ is being distributed equally over each of the paths in the set of paths (ECMP), then for each path, Redistributed Traffic ($T_r$)=$T_i$/number of paths−path bandwidth So if $T_i$ is 3 Gbps, and $T_i$ is forwarded equally over each of three paths, then the flow of traffic over each path is 1 Gbps. If for some reason, the available bandwidth for one of the three paths decreases, due to the bandwidth available to a link along the path decreasing, then TDF will detect that this link is an OUL and perform the above calc.

2. Deactivate/relax ECMP function.

3. Adjust path bandwidth so that OUL becomes UUL, remove this OUL from list.

4. Identify paths with UULs, determine that path bandwidth is underutilized and redistribute traffic calculated in #1 equally to all of these paths without over utilizing any links . . . if this causes a previously UUL to become OUL, then the redistribution of $T_i$ to this path is not permitted. In order to redistribute the traffic, it is necessary to update the forwarding tables as follows. Assuming that ECMPs are identified for a flow of traffic, that each of the path costs have been calculated and that the total path bandwidth is known, then for all ECMPs, OSPF can calculate how much of the flow is distribute of each of the ECMPs as follows:

If there are n ECMPs d(P1-Pn) for a given network destination address

And the respective path bandwidths are BW1-BWn for a total ECMP bandwidth ($BW_{tot}$)=sum (BW1-BWn)

Find the % of the total bandwidth attributable to each path using Equation 1:

$$\% BW \text{ for a path } Pn, BW'n=((BWn \times 100)/BW_{tot}), BW'n \quad \text{Equation 1}$$

is the percentage of the $BW_{tot}$ that is apportioned to path Pn

If the maximum number of ECMPs the forwarding table can support is Emax, then all of the BW, then use Equation 2 to determine how to distribute the ECMPs across Emax.

$$ECMP \% \text{ for path } Pn, En=(BW'n \times E\max)/100 \quad \text{Equation 2}$$

OSPF than uses the information calculated in Equation 2 to program the FIB.

5. If OULs traffic is successfully redistributed (no UULs become OULs), then remove it from OUL list [If the TDF determines that the link is over utilized by 250 Mbps, then TDF will attempt to redistribute this amount of traffic in $T_i$ equally over each of the other paths in the set of paths].
6. Remove any UULs from list that are no longer underutilized after the redistribution
7. If there are no UULs left in any paths, then process terminates with respect to the flow of traffic and the TDF 501 attempts to redistribute a flow of lower priority. Otherwise another router can run the process.
8. Update the path bandwidth store to reflect any changes to the path bandwidths as the result of the redistribution.

As with the TDF 201, traffic redistribution according to the traffic redistribution policy enforced by each instance of TDF501 running in one router in NS 200 can result in the redistribution of traffic over one or more other eligible paths in the NS 200. The TDF 201 continually monitors information received from the NS 200 and attempts to redistribute traffic entering the NS 200 in a manner that enforces the traffic prioritized minimum loss policy.

Referring again to FIG. 1, and as described earlier in the Background, some or all of the routers, ER1-ERn and CR0-CRn, can run a network layer-3 routing protocol, such as the well known OSPF protocol. OSPF uses a cost metric associated with each router interface (physical or logical) to calculate one or more shortest paths from the router to a destination. The cost metric can be assigned to each interface by a system administrator (or automatically) and this cost metric can be dependent on the distance from one router to another (round-trip time), link bandwidth, link availability (delay), and/or link reliability factors to name only four criteria that can be considered when assigning cost to a router interface. The OSPF protocol running on a router uses the costs assigned to each of its interfaces to calculate the shortest paths from it to a destination address, for instance. Specifically, the well known Dijkstra algorithm can be used to calculate the least cost paths through a network system, such as the network system 100 in FIG. 1. The result of applying the Dijkstra algorithm to link state information maintained by each router is a series of connected routers that represent the least cost paths to each router and the cost of each path.

Continuing to refer to FIG. 1, if the result of the calculation to identify the least cost paths from ER1 to ER3 in the NS 100 results in a path P2 cost equal to 3.0 and a path P3 cost equal to 3.0, then OSPF running on ER1 can use the well known Equal Cost Multi-Path (ECMP) routing technique to distribute the traffic Ti evenly/symmetrically between path P2 and path P3 (assuming P2 and P3 have enough available bandwidth to support the traffic). ECMP is a routing technique that is explicitly supported by the OSPF protocol. A number of different methods can be used to determine which of several equal cost paths or next hops are selected. Hash-threshold is one method for determining which of several equal cost next hops to select and the round-robin method is another. Each method has their advantages and disadvantages and the reasons for selecting one of the other method is not discussed here. ECMP routing techniques typically divide the traffic with a common destination equally among the multiple equal cost paths, regardless of the bandwidth that is available on any one of the equal cost paths and regardless of the technique employed to select the traffic transmission path.

Continuing to refer to FIG. 1, if it is assumed, as described above, that the traffic Ti is being forwarded over the two equal cost paths, paths P2 and P3, that the Ti volume is 2 Gbps, that the available bandwidth on path P2 is 1 Gbit/second and that the available bandwidth on path P3 is 2 Gbits/second. The ECMP routing technique operates to evenly forward Ti over each of the two paths, which results in 1 Gbps of Ti traffic flowing through path P1 and 1 Gbps of Ti traffic flowing through path P2. In this case, path P1 is nearly oversubscribed and path P2 is undersubscribed Again, assuming that link L5 is a logical combination of multiple physical links, and in the event that one of the physical links comprising link L5 flaps, L5 can become oversubscribed and some of the Ti traffic can be dropped.

It was discovered that the ECMP routing technique can be modified to consider available link bandwidth and path bandwidth (BWp) independently of path cost when distributing traffic to equal cost paths. This technique is referred to as Weighted Equal Cost Multi-Path (WECMP) routing, and it can be employed by one or more of the routers in the NS 100 of FIG. 1 to distribute traffic ingressing to the routers proportionately according to the bandwidth of each of the paths over which the traffic is distributed. As the result of employing the WECMP routing technique, it is possible to decrease the number of over-subscribed paths in the network, which has the effect of minimizing traffic lost due to over subscription.

Figure 6:
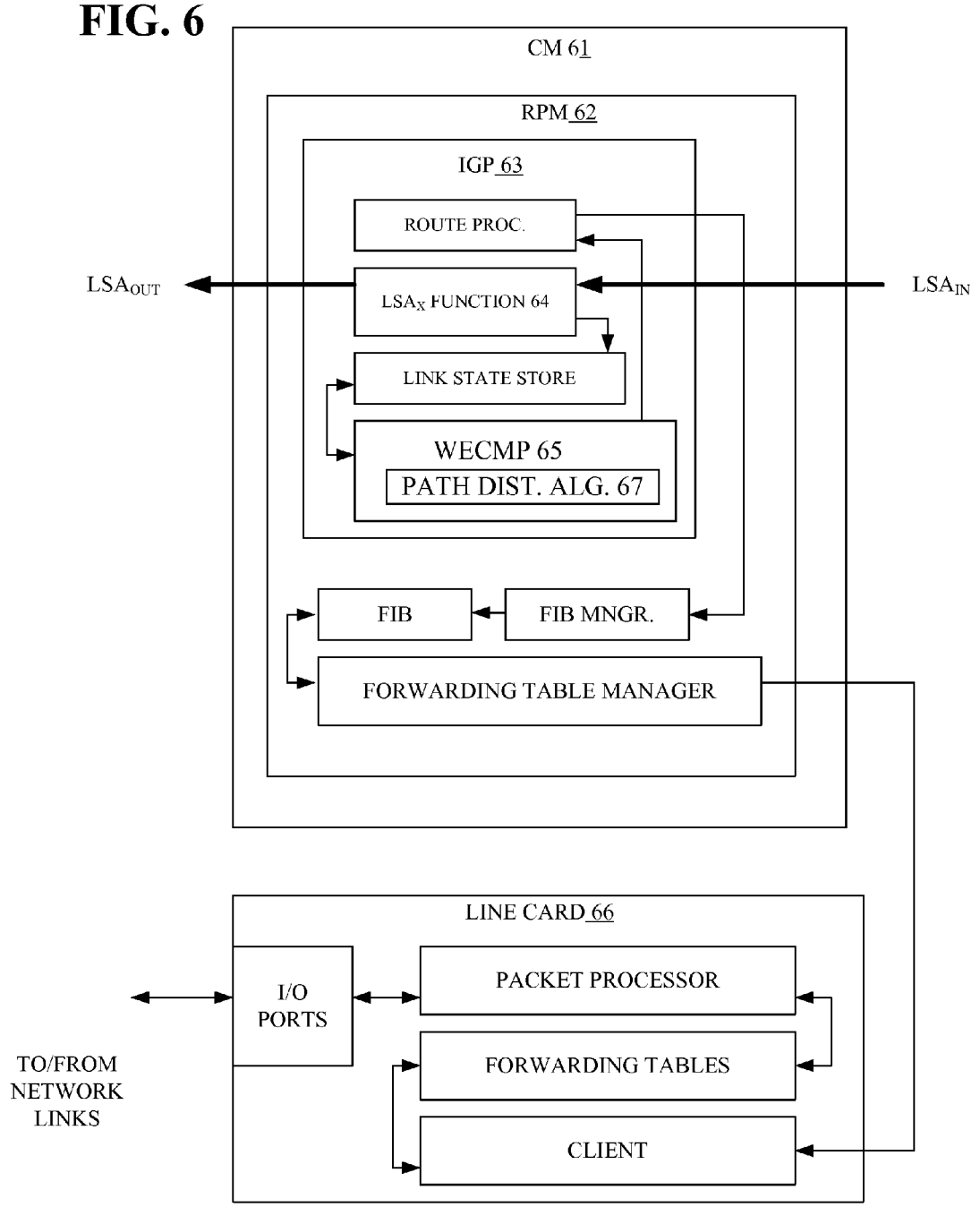
FIG. 6 is a block diagram of a router that includes a weighted ECMP function.

FIG. 6 is a diagram illustrating functional elements that can comprise a router 60 according to an embodiment. For the purpose of this description, router 60 represents any one or more of the CRs or ERs comprising the NS 200 of FIG. 2. Router 60 is comprised of a control module 61 that is generally responsible for running management plane functionality on the router, and one or more line cards (LC) 66 which are generally responsible for data plane functionality. Router 60 can also include switch fabric modules and other functional modules, but for the purpose of this description it is not important to describe their operation and so they are not included in FIG. 6. The control module 61 can include one or more route processor modules (RPMs) which generally operate to run network protocols necessary for the operation of the router 60 in the network environment in which it is located. In this case, a single RPM 62 is shown which can run a layer-3 interior gateway protocol (IGP) 63, such as the well known Open Shortest Path First (OSPF) protocol or the Intermediate System to Intermediate System (IS-IS) protocol. The IGP 63 is comprised of a number of interdependent functions, such as a route processing function, an extended link state advertisement (LSAx) function 64, a WECMP function 65, and it includes a store of state information associated with each of the links in the NS 200. The RPM 62 also includes a forwarding information base (FIB) that is maintained by a FIB manager operating in conjunction with the layer-3 network protocol, and the RPM includes a forwarding table manager sends information and instruction to a forwarding table client function, running on the line card 66, which uses the information and instructions to update appropriate entries in a forwarding table stored on the line card.

Continuing to refer to FIG. 6, and as described above, the IGP 63 included on router 60 supports the transmission of extended link state advertisements (LSAx) to neighboring routers in the NS 200. An LSA is employed by the OSPF protocol to communicate a routers local routing topology to all of the other routers directly connected to it. There are currently eleven different types of LSAs, and one or more of these LSA types can be generated by the OSPF protocol depending upon the needs of the network. According to an embodiment, the IGP in RPM 62 generates an LSA (can be type 9 opaque, type 10 opaque or type 11 opaque) that is extended (LSAx) to include, among other things, information associated with a path bandwidth calculated by the router (for example the LSAx function can include a path bandwidth calculation routine), an interface bandwidth (can be any one of a plurality of logical or physical interface bandwidths associated with the router), the identity or index of the interface, and the interface type (physical, LAG, VLAN). The path bandwidth information calculated by the LSAx function 64 (in this case) can be stored in the link state store on the RPM 62.

Generally, each line card 66 in router 60 is configured to support a maximum number of ECMPs. This support is typically provided by programming the line card 66 forwarding table such that an equal number of table entries are programmed to forwarding a traffic flow on two or more ECMPs. For instance, if first and second equal cost paths are assigned to receive traffic from a particular flow, and if the forwarding table is configured to support six ECMPs, then three entries in the table could be programmed to forward half of the traffic over the first path, and three entries can be programmed to forward half of the traffic over the second path. According to an embodiment, WECMP 65 uses path bandwidth information associated with each one of two or more equal cost paths in a set of equal cost paths (the set of equal cost paths are dedicated to a single traffic flow) to calculate how much traffic can be forwarded over each path in proportion to the paths bandwidth.

The WECMP 65 functionality included in OSPF 63 of RPM 62 includes a path distribution algorithm 67 that operates, using the path bandwidths associated with each equal cost path in a set of equal cost paths, to determine the proportions (by volume) of a traffic flow that will be forwarded over each one of the paths in the set of paths. The output of the path distribution algorithm 67 can be used by the IGP function 63 to update the FIB. The path distribution algorithm operates as follows.

Assuming that a router has identified ECMPs for a flow of traffic, that each of the path costs have been calculated and that the total path bandwidth is known, then for all ECMPs, OSPF can employ WECMP and the individual path bandwidths to calculate how much of the flow is distribute of each of the ECMPs as follows:

If there are n ECMPs d(P1-Pn) for a given network destination address

And the respective path bandwidths are BW1-BWn for a total ECMP bandwidth (BWtot)=sum (BW1-BWn)

Find the % of the total bandwidth attributable to each path using Equation 1:

%$BW$ for a path $Pn$, $BW'n=((BWn \times 100)/BWtot)$, $BW'n$              Equation 1 is the percentage of the BWtot that is apportioned to path Pn

If the maximum number of ECMPs the forwarding table can support is Emax, then all of the BW, then use Equation 2 to determine how to distribute the ECMPs across Emax.

$ECMP$ % for path $Pn$, $En=(BW'n \times Emax)/100$              Equation 2

The following is an example of the operation of the path distribution algorithm 67. Given 2 ECMPs for a destination address, path P1 and path P2, and P1 BW is 1 Gbps and P2 BW is 2 Gbps for a total ECMP BW of BWtot=3 Gbps. Then, according to Eq. 1: BW'1=33.3% and BW'2=66.6%. If Emax is 6, then using Eq. 2, the number of ECMPs used to distribute path P1 bandwidth is 2 and the number of ECMPs used to distribute path P2 bandwidth is 4.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for distributing traffic ingressing to a packet network system, comprising:

providing a separate instance of an interior gateway protocol (IGP), running on each one of a plurality of routers comprising a packet network system, that calculates all eligible paths for traffic through the packet network system;

providing a separate instance of a traffic distribution function, running on each one of the plurality of routers comprising the packet network system, that receives, from each of the other of the plurality of routers, link volume information representative of the volume of traffic ingressing to each of the routers and link bandwidth information representative of available link bandwidth for all links to each of the plurality of routers in the packet network system, and uses the link bandwidth information to calculate a path bandwidth for each of the calculated eligible paths in the packet network system;

using the calculated eligible path bandwidths and the link volume information to calculate under-utilized links that are each associated with a volume of traffic ingressing to the link that is below an available bandwidth of the link and over-utilized links that are each associated with a volume of traffic ingressing to the link that is above an available bandwidth of the link for at least some of the eligible paths in the packet network system;

programming forwarding table entries in each of the plurality of routers to forward higher priority traffic flows over the eligible paths with under-utilized links before forwarding lower priority traffic flows over the eligible paths with under-utilized links, wherein the programming forwarding table entries includes, for each traffic flow:

identifying a plurality of equal cost multi-paths (ECMPs) for that traffic flow;

determining a total ECMP bandwidth for that traffic flow;

determining a pre-redistribution percentage of the total ECMP bandwidth attributable to each of the plurality of ECMPs; and determining a redistribution of that traffic flow across the plurality of ECMPs, wherein each ECMP is provided a redistributed percentage of that traffic flow that is based on the pre-redistribution percentage of the total ECMP bandwidth attributable to that ECMP and the maximum number of ECMPs that the forwarding table can support;

receiving a first traffic flow and determining a priority for the first traffic flow that is based on at least one of: a bandwidth needed to support the first traffic flow, a number of hops from an ingress router to a destination for the first traffic flow, an identity of the router into which the first traffic flow has ingressed, and an identity of the router out of which the first traffic flow has egressed; and forwarding the first traffic flow over one or more eligible paths in the packet network system using the determined priority and the forwarding tables entries in each of the plurality of the routers in the packet network system.

2. The method of claim 1 wherein the IGP is an Open Shortest Path First or an Intermediate System to Intermediate System network protocol.

3. The method of claim 1 wherein the traffic ingressing to the packet network system is comprised of one or more traffic flows and the calculated eligible paths includes a set of paths of equal cost, as calculated by the IGP running on each of the routers, over which each one of the one or more traffic flows ingressing to the routers is forwarded to reach their destination.

4. The method of claim 1 wherein the traffic distribution function is comprised of a link utilization calculation function, a path bandwidth calculation function and a redistribution algorithm function all of which can access a store of packet network system information.

5. The method of claim 4 wherein the redistribution algorithm function operates to distribute traffic that results in a minimal loss of all traffic ingressing to the packet network system.

6. The method of claim 1 wherein the link volume information representative of the volume of traffic ingressing to each of the routers is comprised of the total traffic volume ingressing to each of the routers.

7. The method of claim 6 wherein the total traffic volume ingressing to each of the routers is comprised of the sum of the volume of one or more traffic flows.

8. A method for distributing traffic ingressing to a packet network system, comprising:
    providing a separate instance of an interior gateway protocol (IGP), running on each one of a plurality of routers comprising a packet network system, that calculates all eligible paths over which traffic is forwarded through the packet network system;
    providing a separate instance of a traffic distribution function, running on each one of the plurality of routers comprising the packet network system, that receives, from each of the other of the plurality of routers, link volume information representative of the traffic ingressing to the routers and link bandwidth information representative of available link bandwidth for all links to each of the plurality of routers in the packet network system, and using the link bandwidth information to calculate a path bandwidth for each of the calculated eligible paths in the packet network system;
    using one or more traffic prioritization criteria that include a bandwidth needed to support a received traffic flow to derive a traffic distribution priority for each of a plurality of traffic flows comprising the traffic ingressing to the packet network system such that the plurality of traffic flows include higher priority traffic flows and lower priority traffic flows;
    using the calculated eligible path bandwidths and the link volume information to calculate under-utilized links that are each associated with a volume of traffic ingressing to the link that is a predetermined amount greater than an available bandwidth of the link and over-utilized links that are each associated with a volume of traffic ingressing to the link that is a predetermined amount less than an available bandwidth of the link for at least some of the eligible paths in the packet network system;
    programming forwarding table entries in each of the plurality of routers to distribute higher priority traffic flows over the eligible paths with under-utilized links before distributing lower priority traffic flows over the eligible paths with under-utilized links, wherein the programming forwarding table entries includes, for each traffic flow:
        identifying a plurality of equal cost multi-paths (ECMPs) for that traffic flow;
        determining a total ECMP bandwidth for that traffic flow;
        determining a pre-redistribution percentage of the total ECMP bandwidth attributable to each of the plurality of ECMPs; and
        determining a redistribution of that traffic flow across the plurality of ECMPs, wherein each ECMP is provided a redistributed percentage of that traffic flow that is based on the pre-redistribution percentage of the total ECMP bandwidth attributable to that ECMP and the maximum number of ECMPs that the forwarding table can support; and
    forwarding the plurality of traffic flows over one or more eligible paths using a priority determined for each of the plurality of traffic flows according to the traffic distribution priority and the forwarding table entries in each of the plurality of the routers in the packet network system.

9. The method of claim 8 wherein the IGP is an Open Shortest Path First or an Intermediate System to Intermediate System network protocol.

10. The method of claim 8 wherein the calculated eligible paths includes a set of paths of equal cost, as calculated by the IGP running on each of the routers, over which each of the plurality of traffic flows ingressing to the routers is forwarded to reach their proper destination.

11. The method of claim 8 wherein the traffic distribution function is comprised of a link utilization calculation function, a path bandwidth calculation function and a redistribution algorithm function, each of which access a store of packet network system information to perform their functions.

12. The method of claim 11 wherein the redistribution algorithm function operates to first distribute traffic of the highest priority.

13. The method of claim 8 wherein the link volume information representative of the volume of traffic ingressing to each of the routers is comprised of the total traffic volume ingressing to each of the routers.

14. The method of claim 13 wherein the total traffic volume ingressing to each of the routers is comprised of the sum of the volume of one or more traffic flows.

15. The method of claim 8 wherein the traffic prioritization criteria also include at least one of a number of hops from an ingress router to a destination for the received traffic flow, an identity of a router into which the received traffic flow has ingressed, and an identity of a router from which the received traffic flow has egressed.

* * * * *